(12) United States Patent
Van Der Made et al.

(10) Patent No.: US 11,157,800 B2
(45) Date of Patent: Oct. 26, 2021

(54) NEURAL PROCESSOR BASED ACCELERATOR SYSTEM AND METHOD

(71) Applicant: Brainchip Inc., Aliso Viejo, CA (US)

(72) Inventors: Peter A J Van Der Made, Aliso Viejo, CA (US); Anil Shamrao Mankar, Mission Viejo, CA (US)

(73) Assignee: BRAINCHIP, INC., Aliso Viejo, CA (US)

( * ) Notice: Subject to any disclaimer, the term of this patent is extended or adjusted under 35 U.S.C. 154(b) by 422 days.

(21) Appl. No.: 15/218,075

(22) Filed: Jul. 24, 2016

(65) Prior Publication Data

US 2017/0024644 A1     Jan. 26, 2017

Related U.S. Application Data

(60) Provisional application No. 62/196,863, filed on Jul. 24, 2015.

(51) Int. Cl.
    *G06N 3/063*       (2006.01)
    *G06N 3/04*        (2006.01)

(52) U.S. Cl.
    CPC ............. *G06N 3/063* (2013.01); *G06N 3/049* (2013.01)

(58) Field of Classification Search
    CPC ............ G06N 3/02; G06N 3/06; G06N 3/049; G06N 3/061; G06N 3/063
    See application file for complete search history.

(56) References Cited

U.S. PATENT DOCUMENTS 5,712,922 A    1/1998   Loewenthal et al.
8,117,137 B2   2/2012   Xu et al.
(Continued)

FOREIGN PATENT DOCUMENTS

WO    WO-2017003491 A   *   1/2017  ............. G06N 3/063

OTHER PUBLICATIONS

Merolla, Paul, et al. "A digital neurosynaptic core using embedded crossbar memory with 45pJ per spike in 45nm." 2011 IEEE custom integrated circuits conference (CICC). IEEE, 2011. (Year: 2011).*

(Continued)

*Primary Examiner* — Luis A Sitiriche
*Assistant Examiner* — Sehwan Kim
(74) *Attorney, Agent, or Firm* — Sterne, Kessler, Goldstein & Fox P.L.L.C.

(57) ABSTRACT

A configurable spiking neural network based accelerator system is provided. The accelerator system may be executed on an expansion card which may be a printed circuit board. The system includes one or more application specific integrated circuits comprising at least one spiking neural processing unit and a programmable logic device mounted on the printed circuit board. The spiking neural processing unit includes digital neuron circuits and digital, dynamic synaptic circuits. The programmable logic device is compatible with a local system bus. The spiking neural processing units contain digital circuits comprises a Spiking Neural Network that handles all of the neural processing. The Spiking Neural Network requires no software programming, but can be configured to perform a specific task via the Signal Coupling device and software executing on the host computer. Configuration parameters include the connections between synapses and neurons, neuron types, neurotransmitter types, and neuromodulation sensitivities of specific neurons.

24 Claims, 5 Drawing Sheets

(56) References Cited

U.S. PATENT DOCUMENTS

| | | | |
|---|---|---|---|
| 8,131,659 B2 | 3/2012 | Xu et al. | |
| 8,250,011 B2* | 8/2012 | van der Made | G06N 3/088 706/27 |
| 8,648,867 B2 | 2/2014 | Gorchetchnikov et al. | |
| 9,153,230 B2 | 10/2015 | Maaninen | |
| 2007/0192863 A1 | 8/2007 | Kapoor | |
| 2013/0031039 A1* | 1/2013 | Sim | G06N 3/049 706/26 |
| 2014/0289445 A1 | 9/2014 | Savich | |

OTHER PUBLICATIONS

Arthur, John V., et al. "Building block of a programmable neuromorphic substrate: A digital neurosynaptic core." the 2012 international joint conference on Neural networks (IJCNN). IEEE, 2012. (Year: 2012).*

Merolla, Paul, et al. "A digital neurosynaptic core using embedded crossbar memory with 45pJ per spike in 45nm." 2011 IEEE custom integrated circuits conference (CICC). IEEE, 2011. (Year: 2011).*

Arthur, John V., et al. "Building block of a programmable neuromorphic substrate: A digital neurosynaptic core." the 2012 international joint conference on Neural networks (IJCNN). IEEE, 2012. (Year: 2012).*

Bamford, Simeon A., Alan F. Murray, and David J. Willshaw. "Large developing axonal arbors using a distributed and locally-reprogrammable address-event receiver." 2008 IEEE International Joint Conference on Neural Networks (IEEE World Congress on Computational Intelligence). IEEE, 2008. (Year: 2008).*

Querlioz, Damien, et al. "Bioinspired networks with nanoscale memristive devices that combine the unsupervised and supervised learning approaches." 2012 IEEE/ACM International Symposium on Nanoscale Architectures (NANOARCH). IEEE, 2012. (Year: 2012).*

Bamford, Simeon A., Alan F. Murray, and David J. Willshaw. "Large developing receptive fields using a distributed and locally reprogrammable address-event receiver." IEEE transactions on neural networks 21.2 (2010): 286-304. (Year: 2010).*

Imam, Nabil, and Rajit Manohar. "Address-event communication using token-ring mutual exclusion." 2011 17th IEEE International Symposium on Asynchronous Circuits and Systems. IEEE, 2011. (Year: 2011).*

Forssell, Mats. "Hardware implementation of artificial neural networks." Information Flow in Networks 18 (2014): 1-4. (Year: 2014).*

Ouyang, "A Practical Implementation of GPU based Accelerator for Deep Neural Networks." 4th Workshop on SoCs, Heterogeneous Architectures and Workloads Feb. 23, 2013.

Zhang, "Optimizing FPGA-based Accelerator Design for Deep Convolutional Neural Networks." Center for Energy-Efficient Computing and Applications, Peking University, China; Computer Science Department, University of California, Los Angeles, USA; PKU/UCLA Joint Research Institute in Science and Engineering Feb. 22, 2015.

* cited by examiner

NEURAL PROCESSOR BASED ACCELERATOR SYSTEM AND METHOD

CROSS-REFERENCE TO RELATED APPLICATION

This application claims the benefit of U.S. Provisional Patent Application No. 62/196,863, filed Jul. 24, 2015, the disclosures of which are hereby incorporated by reference in their entirety.

FIELD OF THE INVENTION

The present invention relates to an accelerator system and method for artificial intelligence systems, and more particularly to an accelerator system having one or more dedicated spiking neural processing units, a signal coupling device compatible to PCI, PCI-X, PCIe, or USB industry standards or functional similar bus, the whole implemented on a printed circuit board. Spiking neural networks are a method of information processing by means of precision-timed pulses, known as 'spikes'.

BACKGROUND

In order to enhance the processing power, the parallelism of the computing system is increased by raising the number of computing units and an increased clock rate. This evolution is evident from the present day computer systems having several general purpose processing units designed to work in parallel. In high performance computing, this concept is taken even further, where the computing devices are integrated with accelerators. An accelerator is a piece of computing hardware separated from the central processing unit (CPU) that contains many processing units with reduced functionality but specifically designed to run computationally intensive tasks very fast.

An accelerator improves the overall performance of the processing power of the computer system. The accelerator system is connected to the computer system through an expansion slot in the motherboard. One such graphic processor based accelerator system is disclosed in U.S. Pat. No. 8,648,867. The graphic processor based accelerator system is implemented on an expansion card comprising a printed circuit board having one or more graphic processing units, two or more associated memory banks, a specialized controller and a local bus signal coupling compatible with PCI industry standards. The graphic processor is programmable to perform a variety of tasks, which may include a software neural network task.

A more advanced version of an accelerator system is described in U.S. Pat. No. 8,131,659. The accelerator system utilizes field programmable gate array (FPGA) technology to achieve better parallelism and processing speed. The system comprises a field programmable gate array device configured to have hardware logic performing computations associated with a neural network training algorithm, such as LambaRank, which is dedicated to context ranking in Web search. The accelerator system is designed to process large data sets such as that related to web relevance ranking.

The accelerator systems that exist in the prior art are software dependent whereby software programs define or control the operations of the accelerator systems and are mainly based on sequentially programmed digital computer architectures or perform a single, dedicated function. However, the software or hardware that executes software-based accelerator systems fail to solve a class of computational problems where the overall speed increase is insufficient, such as problems that relate to cognition, including but not limited to real-time complex tasks in image recognition, olfactory recognition, sound localization, recognition of sound and acoustic characteristics, balance, gait control, association between the senses, reasoning and thinking.

Such types of computational problems are relatively easily and quickly solved by human brains which consist of spiking neural networks. A spiking neural network comprises a plurality of neurons, including dendrites and a plurality of synapses that carry information in the shape of spikes to a target neuron. Spikes are defined as short pulses or bursts of electrical energy. One dendrite of a neuron and one axon of another neuron are connected by a biological structure called a synapse. The synapse also receives feedback when the post-synaptic neuron produces a spike which causes the efficacy of the connection to be modified. Pluralities of networked neurons are triggered in an indicative spatial and temporal activation pattern as a result of a specific input signal pattern. Each input spike relates to an event. An event can be described as the occurrence of a specific frequency in an audio stream, the occurrence of a contrast transition in visual information, and a plethora of other physical phenomena that are detectable by the senses. Feedback of output spikes to synapses drives a process known as spike time dependent plasticity, commonly abbreviated as STDP, whereby the efficacy of a synapse is modified depending on the temporal difference of input to output spikes. This process is thought to be also responsible for learning and memory functions in the brain.

The aforementioned principle forms the basis of the field of artificial spiking neural networks which is directed to develop intelligent machines that use computational and learning methods based on mechanisms related to the neural functions in the human brain. An artificial spiking neural network is an approximation of the functions of a biological neural network and is intended to perform complex non-linear functions for pattern learning and recognition. The artificial neural network can be trained or spontaneously learn to respond to input stimuli. U.S. Pat. No. 8,250,011, describes a system based on artificial neural network learning. The patent discloses a dynamic artificial neural computing device that is capable of approximation, autonomous learning and strengthening of formerly learned input patterns. The device can be trained and can learn autonomously owing to the artificial spiking neural network that is intended to simulate or extend the functions of a biological nervous system. Since the artificial spiking neural network simulates the functioning of the human brain; it becomes easier for the artificial neural network to solve those computational problems that are not suited to solutions by sequentially programmed digital computer architectures.

In view of the aforementioned reasons, the present invention provides an accelerator system based on an artificial spiking neural network.

SUMMARY OF INVENTION

An artificial spiking neural network is an approximation of the functions of a biological neural network and is intended to perform complex non-linear functions for pattern learning and recognition on a given data set. In the embodiment of the present invention, a plurality of neurons and synapses are integrated in an application specific integrated circuit (ASIC) or a programmable logic device comprising a spiking neural processing unit.

The spiking neural processing unit comprises a plurality of digital neuron circuits, including dendrite circuits, comprised of digital logic gates, and configurably connected to a plurality of digital, dynamic synapse circuits, also comprised of digital logic gates, connected to produce at least one output signal in response to at least one input signal. The present invention includes information processing systems and methods that are inspired by certain aspects of a biological neural network. The combined functions of a plurality of synaptic circuits connected to a dendrite and subsequently to a neuron soma circuit, jointly called an artificial neuron, correspond to biological synapses, dendrites and a neural soma, respectively. Construction of the artificial neuron array from standard binary logic gates, whereby analogue values are simulated in registers, has allowed the creation of large arrays in VLSI devices using current state of the art semiconductor manufacturing techniques.

Each sensory neuron may comprise any one or a combination of sensory devices such as a multi-element microphone, an artificial cochlea, a multi-element optical device, a biological unit, or a chemical material.

Depending on synaptic efficacy as the result of learning and the artificial neuron previous activation history, different artificial neurons in general respond differently to the same input signal. The output of each artificial neuron provides a probability that the spatial and temporal input pattern closely approximates a pattern that was learned previously, and is indirectly represented in the efficacy values stored in the synapses. This produces different output signals, selecting a group or several groups of inter-neurons which in turn perform similar temporal probability functions and so on throughout the Spiking neural network. This provides a specific way of transforming a spatial-temporal pattern consisting as spatial distributed signal trains of spikes into a hierarchical spatial-temporal pattern of activation that increases in complexity as the data is progressed through the Spiking neural network, and correspondingly reduces data intensity. Concurrently the network of neurons and inter-neurons is learning to respond to certain spatial-temporal characteristics of input signals. Learning occurs autonomously, and is derived from a biological process known as STDP. This learning method involves a synaptic efficacy value that determines the coupling factor between neurons. The synaptic efficacy value is increased when the input spike precedes the output spike and decreased when the output spike precedes the input spike.

The synapse efficacy value increase is greatest at the shortest interval between the input spike followed by the occurrence of an output spike. The synapse efficacy value decrease is greatest at the shortest interval between an output spike followed by the occurrence of an input spike.

The spiking neural processing unit can be trained as well as it spontaneously learns to respond to stimuli present in the applied data set. In one aspect of the present invention, a configurable Spiking Neural Network accelerator system is provided. The accelerator system comprises an interface to connect the configurable accelerator system to a host computing device; one or more neural processing units having a plurality of digital circuits comprising spiking artificial neurons and dynamic synapses, and a programmable logic device. The programmable logic device comprises a signal coupling device. The one or more neural processing units is a spiking artificial neural processing unit and it comprises a first means to convert data received from the host computing device to spikes and a second means to convert the resulting output spikes into output values and communicating these output values to the host computing device through the signal coupling device.

The first means that converts the data from the host computing device to a spike is a sensory neuron, and the second means that converts the output result in the form of spike to an output value is a motor neuron. The operations in the neural processing unit are performed by a combinational digital logic circuit.

The third means that receives data from the host computing device to a spike is an Address Event Representation (AER) bus, which is an industry standard. In the AER protocol, each spike event is expressed as an address, specific for a particular neuron, and which is placed on the bus at the time that the neuron spikes.

The artificial neural network comprises a plurality of neuron circuits, each neuron circuit having a unique address; and a plurality of synapse circuits. An application programming interface controls the connection of each neuron circuit to a plurality of synapse circuits in a configuration that is required for a running application. The efficacy of the connection between a synapse circuit and a neuron circuit and the synapse circuit can be determined either by the application program on the host computer, or can be determined by autonomous learning or combinations thereof.

BRIEF DESCRIPTION OF DRAWINGS

The preferred embodiment of the invention will hereinafter be described in conjunction with the appended drawings provided to illustrate and not to limit the scope of the invention, wherein like designation denote like element and in which.

DETAILED DESCRIPTION OF DRAWINGS

In the following detailed description of embodiments of the invention, numerous specific details are set forth in order to provide a thorough understanding of the embodiments of the invention. However, it will be obvious to a person skilled in the art that the embodiments of the invention may be practiced with or without these specific details. In other instances, well known methods, procedures and components have not been described in details so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the spirit and scope of the invention.

In an embodiment of the present invention, an accelerator system based on an artificial spiking neuron circuit is provided. The accelerator system is implemented on an expansion card having a printed circuit board. The printed circuit board is having one or more application specific circuit comprising a spiking neural network having one or more artificial neurons forming an artificial neural network and means to change input data to spikes and spikes to output data. A programmable logic device performs coupling of the accelerator internal busses to the PCI or PCIe bus of the host system. The accelerator system is intended to perform complex non-linear functions for pattern learning and recognition. The neural processing units can be trained as well as they spontaneously learn to respond to stimuli through the STDP machine learning process or combinations thereof.

Figure 1:
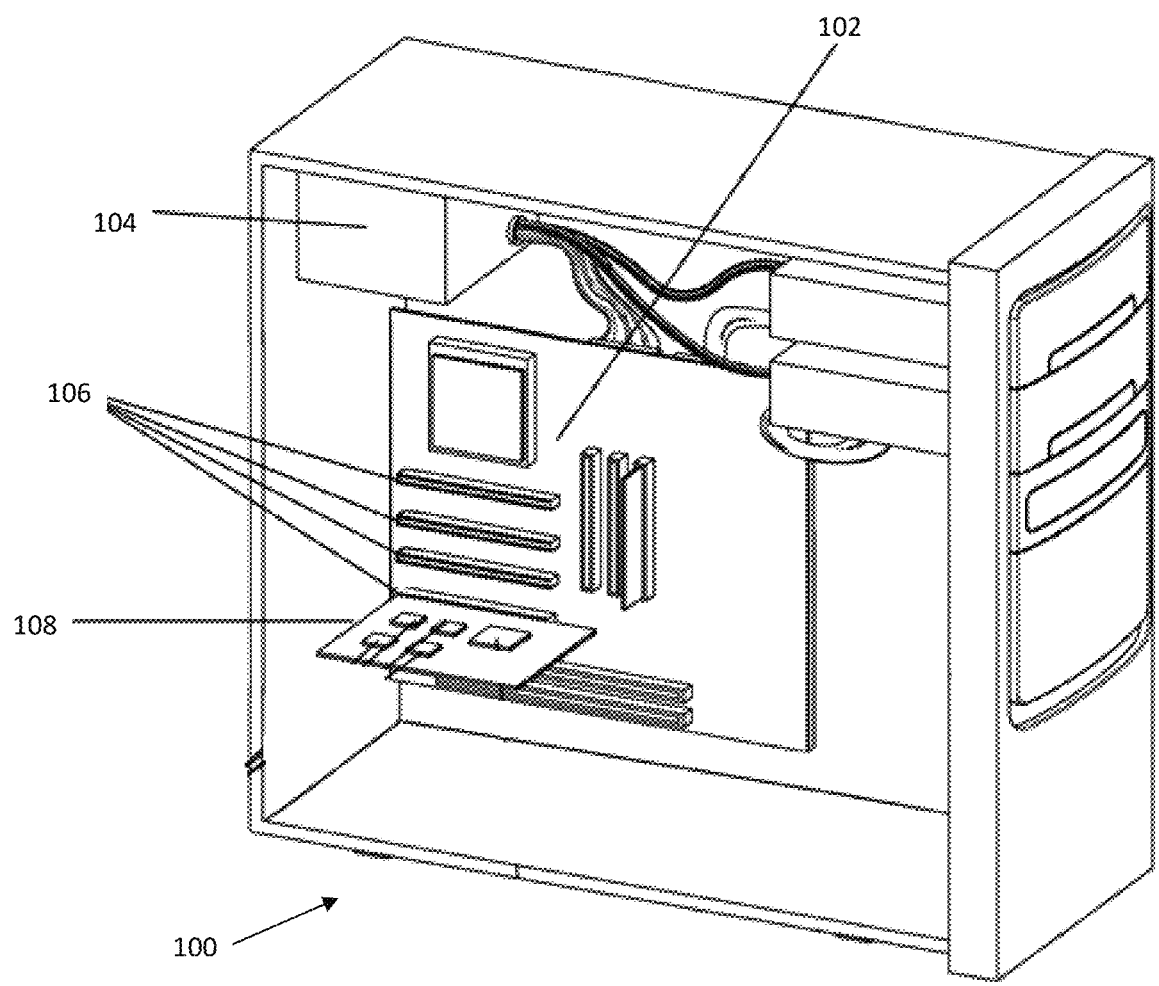
FIG. 1 illustrates the accelerator hardware installed in an expansion slot in a desktop computer host system

FIG. 1 illustrates the hardware configuration for using a spiking neural processing unit based accelerator system. The hardware architecture includes a host computing device 100, which for illustration purpose is shown as a standard personal computer. Other suitable computing environments can also be used for this invention, which includes but are not limited to, workstations, server computers, supercomputers, notebook computers, hand-held electronic devices such as cell phones, micro-controllers, industrial Programmable Logic Controllers, digital cameras, or personal digital assistants (PDAs), multiprocessor systems, programmable consumer electronics, networks of any of the above-mentioned computing devices, and distributed computing environments that include any of the above-mentioned computing devices.

The host computing device 100 includes various components such as a motherboard 102, a disk drive, a power supply 104, etc. The motherboard 102 includes a socket for mounting a central processing unit (CPU) and a socket for mounting one or more memory modules, and a plurality of expansion slots 106 for mounting additional expansion cards 108. The expansion slots 106 on the motherboard can be used to insert and install additional card-type expansion cards. Generally, the expansion slots are classified into an accelerated graphics port (AGP) type, a peripheral component interconnection (PCI) type, and an industry standard architecture (ISA) type according to the type of a bus supported by a system circuit board.

In one implementation, the spiking neural network based accelerator system is implemented as an expansion card 108 on the expansion slot 106 present on the motherboard 102 of the host computing device 100. The expansion card 108 is connected to the CPU installed on the mother board 102 and to the system memory. In the current example, the expansion card 108 communicates to the motherboard 102 via a local system bus. The local system bus can be industry standard PCI-express, PCI-X, PCIe, USB or functionally similar technology.

Figure 2:
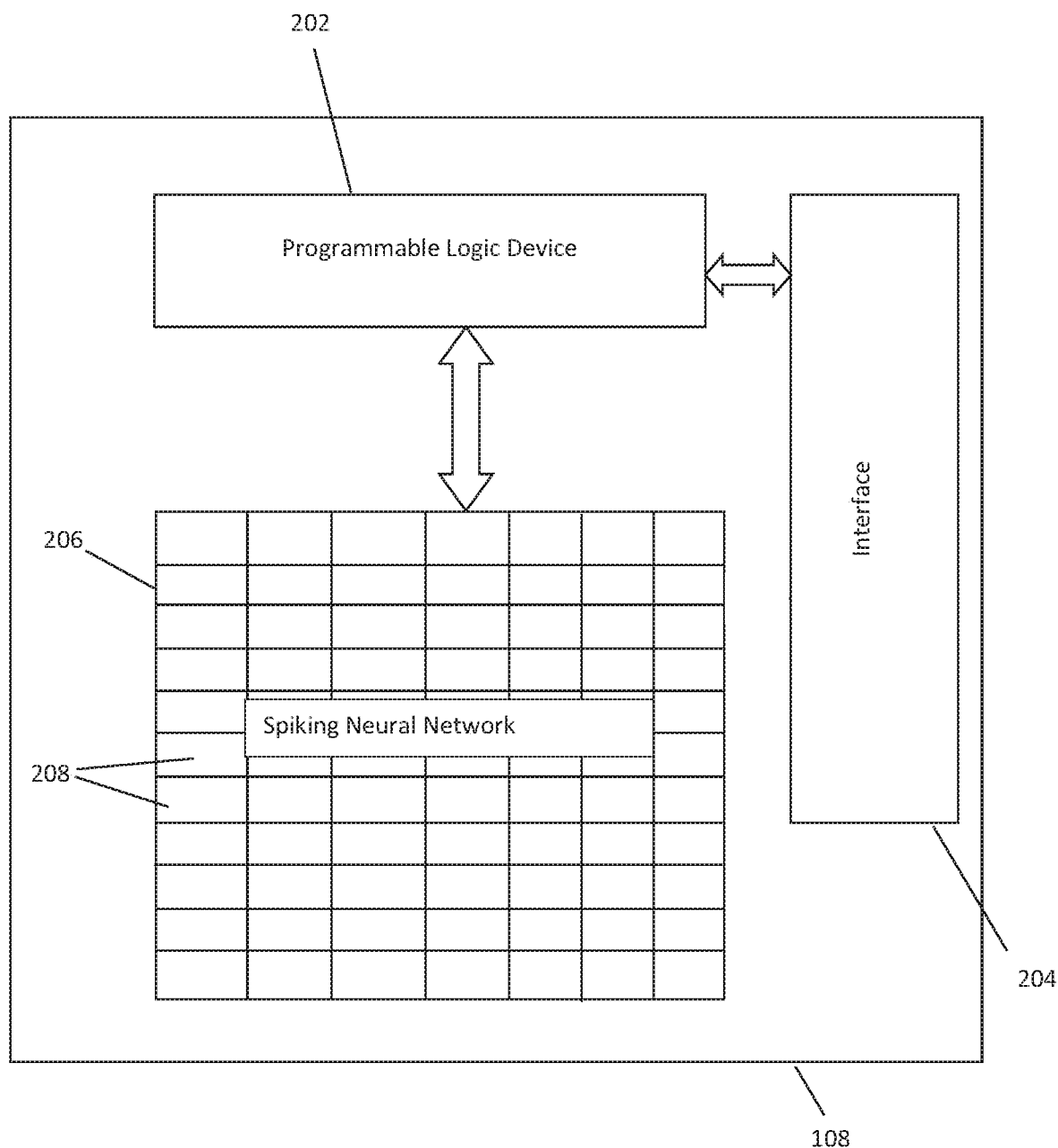
FIG. 2 illustrates the components of an expansion card 108 having a spiking neural processing based accelerator system, in accordance with an embodiment of the present invention.

FIG. 2 illustrates the components of an expansion card 108 having a spiking neural processing based accelerator system, in accordance with an embodiment of the present invention. The expansion card 108 comprises a spiking neural network 206 and a programmable logic device 202. The spiking neural network 206 comprises one or more neural processing units 208 made of a plurality of artificial spiking neurons and synapse circuits. The programmable logic device 202 consists of a signal coupling device and it handles the primitive operations required to communicate with, configure and control one or more neural processing units 208. The neural processing unit 208 provides means to communicate with the signal coupling device and all other modules of an artificial neural network. The operation of the expansion card 108 is controlled by the combined effect of the signal coupling device and the spiking neural network 206. Therefore, the task associated with the expansion card 108 is executed without the involvement of the central processing unit of the host computing device 100. Resultantly, the CPU of the host computing device 100 is freed from this task and can be dedicated to other tasks. The processing speed of the host computing device 100 may be effectively increased. The spiking neural network 206 and the signal coupling device communicate with the host computing device 100 through an interface 204 which connects to the expansion slot 106.

The spiking neural network 206 comprises a plurality of neural processing units 208 that further comprises a plurality of digital neuron circuits, including dendrites and a plurality of synapse circuits forming at least one spiking neural network. Each neuron circuit contains a unique address. The connections between neuron circuits and synapse circuits are configurable by the CPU of the host computing device 100 through the signal coupling device. The data exchanged with the expansion card 108 comprises the configuration parameters of each neuron circuit, including connection data, and the input and output data to the spiking neural network 206. The connection data comprises information for each neuron, including but not limited to the neuron type, address, neurotransmitter type and the neuromodulator to which the synapses and neurons respond. Each synapse contains a register that can be configured to hold the address of a connected neuron. Neurons connect to a plurality of synapses in a one-to-many configuration. The input data comprises values that are considered relevant to the computation task that is performed by the spiking neuron network 206. The neural computation is performed independent of the central processing unit of the computing device 100. The output data comprises values that are the result of the performed neural computation task. One aspect of the Spiking Neural Network accelerator is that it is fast compared to the processing speed of the host computer.

Figure 3:
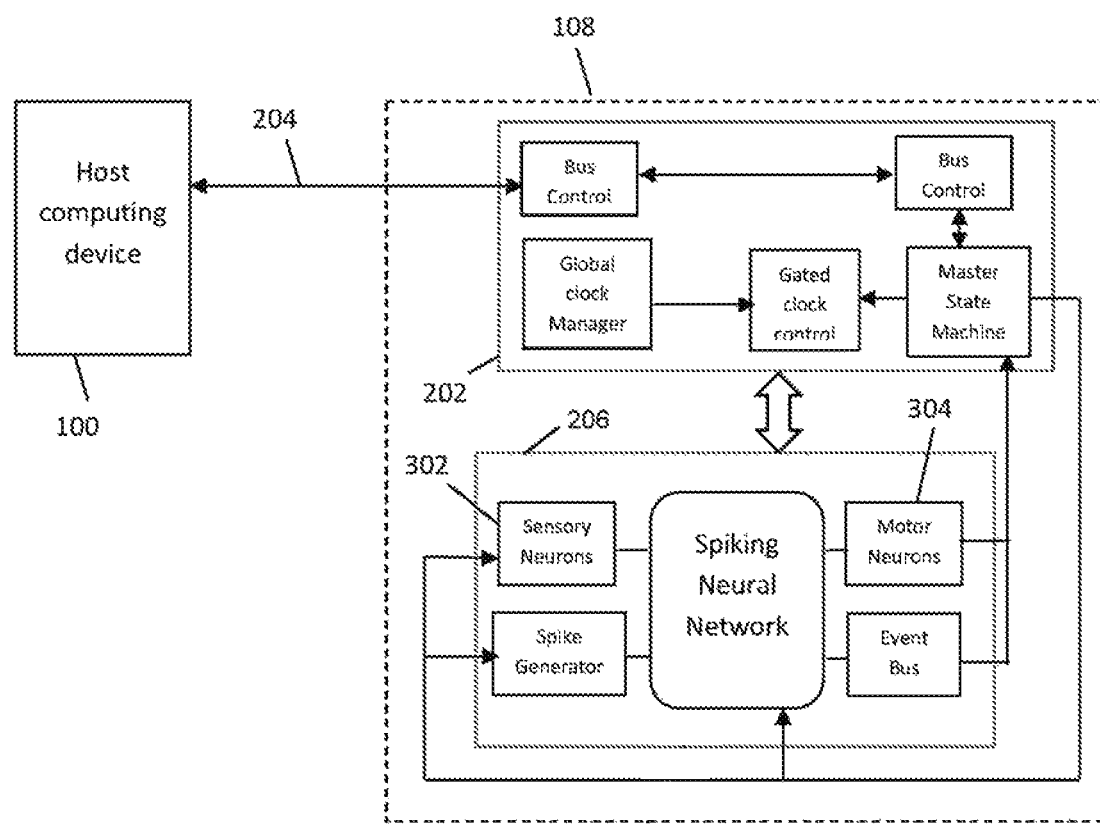
FIG. 3 shows a block diagram of an accelerator system, in accordance with an embodiment of the present invention.

FIG. 3 shows a block diagram of an accelerator system, in accordance with an embodiment of the present invention. The accelerator system is connected to a host computing device 100 through a local system bus. The accelerator system is executed on an expansion card 108 that is in the form of a printed circuit board. The 'accelerator system', the 'expansion card' and the 'printed circuit board' may be interchangeably used and are represented by the same numerical reference as 108 without departing from the meaning and scope of the present invention. The expansion card 108 may also be interchangeably referred to as 'accelerator system expansion card' without departing from the meaning and scope of the present invention. The accelerator system comprises a programmable logic device 202 which is having a communication protocol through which the host computing device 100 communicates with the accelerator system.

The accelerator system 108 has one or more application specific integrated circuits (ASIC) comprising a spiking neural network 206 having a plurality of neural networking units 208. Each of the plurality of neural processing units 208 contains a network of artificial neuron circuits and a means to communicate and together form a homogeneous Spiking Neural Network. In the present embodiment, communication between ASIC circuits is by means of an Address Event Representation (AER) bus in which each event is expressed as the address of the neuron from which the event originated. The accelerator system 108 also comprises a programmable logic device 202 containing a signal coupling device compatible to the local system bus. The local system bus includes but is not limited to industry standards PCI-express, PCI-X, USB or functionally similar technologies. The host computing device 100 connects with the neural processing units 208 through the programmable logic device 202 via the local system bus. The communications protocol includes the functions to configure the behavior and connectivity of neuron circuits within the spiking neural network 206.

The digital data is communicated from the host computing device 100 to the spiking neural network 206 through signal coupling device that transfers the digital data to one or more sensory neurons present within the accelerator system. The one or more sensory neurons 302 and a spike generator act as an input to the spiking neural network, which convert the digital data coming from the host computing device to spikes. Spikes have a temporal and spatial distribution that is a representative of the data values from which they are derived. The spikes are then communicated to the spiking neural network whereby the spikes are processed to derive an output result which is in the form of spikes. The output spikes are then fed into one or more motor neurons 304 to convert the spikes into output digital data. The digital output data is then communicated to the host computing device through the signal coupling device. Alternatively, the input and output spikes of the neural network are transferred respectively from and to the host computer through the signal coupling device by means of an AER bus.

The connections between neuron circuits and synapse circuits are configurable by central processing unit (CPU) of the host computing device 100 through the signal coupling device. The central processing unit of the host computing device exchanges data with the spiking neural network which includes the configuration parameters of each neuron circuit, including connection data, and the input and output data to the spiking neural network 206. The connection data comprises information for each neuron, including but not limited to the neuron type, address, neurotransmitter type and the neuromodulator to which the synapses and neurons respond, thus configuring the neural network for different applications. The application programming interface includes functions to connect selected neurons and synapses present within one or more neural processing units. The application programming interface is configured to preset and determine the connection efficacy between neurons and synapses present within one or more neural processing units in addition or as an alternative to the autonomous learning of efficacy values.

The spiking neural network 206 is configured to have digital hardware logic performing spatial, temporal and learning operations on the incoming spikes, thereby avoiding the time-consuming operation of a software program stepping through instructions and performing calculations. The spiking neural network 206 is capable of intelligently and autonomously learning to recognize repeating patterns in the data stream. The spiking neural network 206 is capable of approximation, autonomous learning, recall and strengthening of formerly learned input patterns. At the initial stage of execution, the data is downloaded into a buffer memory attached to the signal coupling device 202. During the operational state, the spiking neural network processes the contents of the buffer and is capable of autonomously learning to recognize patterns by temporal comparison of input and output spikes as described in readily accessible documentation relating to Spike Time Dependent Plasticity (STDP).

Figure 4:
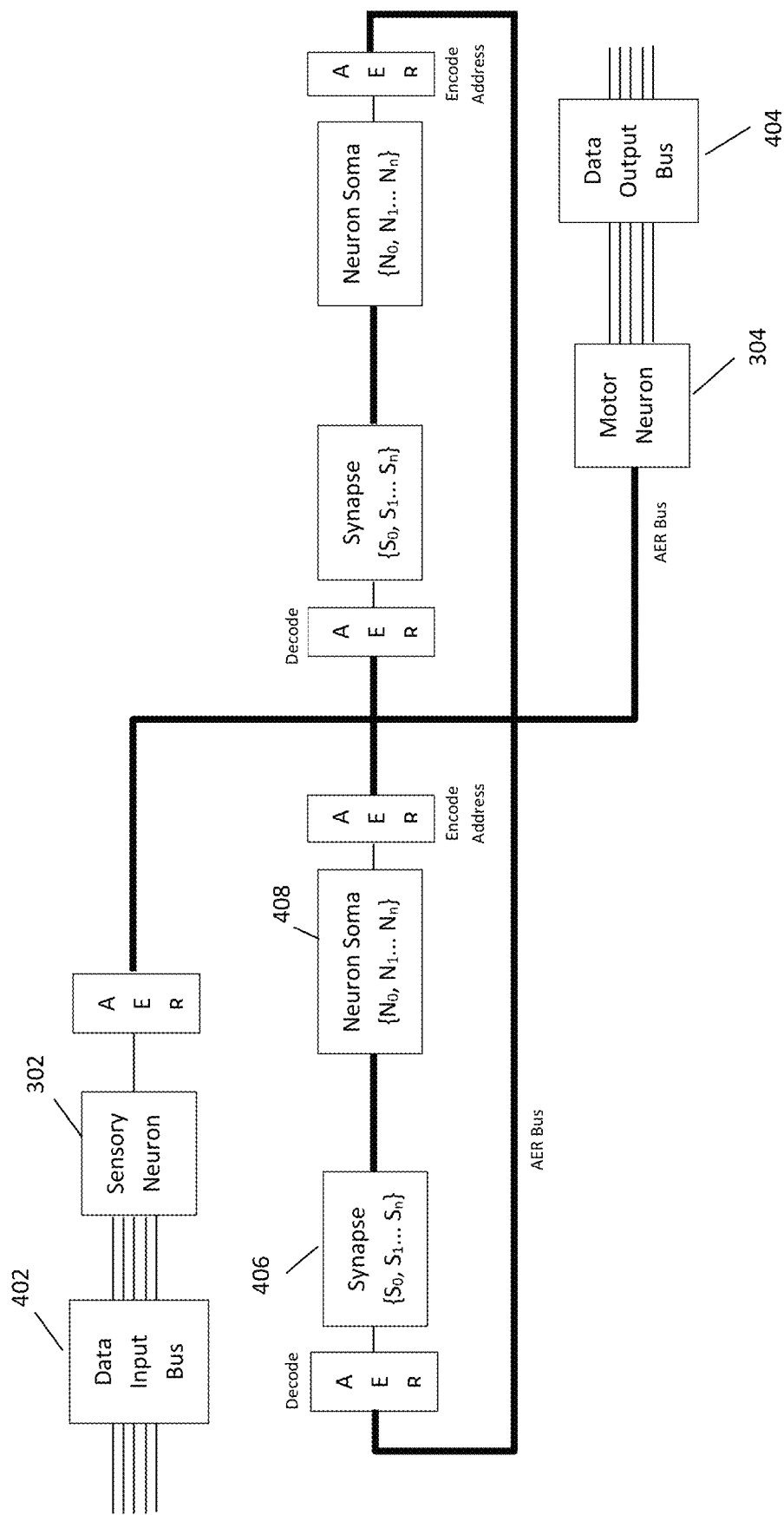
FIG. 4 shows a circuit diagram of a spiking neural network, in accordance with an embodiment of the present invention.

FIG. 4 shows a diagram of a spiking neural network in accordance with an embodiment of present invention. The spiking neural network comprises a plurality of circuits configured to have hardware logic comprising an artificial neural network with dynamic synapses and spike time dependent plasticity (STDP) learning method. The spiking neural network comprises a plurality of digital neuron circuits 408 and a plurality of synapse circuits 406. Each neuron circuit contains a unique address. The connections between the neuron circuits 408 and the synapse circuits 406 are configurable by the central processing unit of the host computing device through the signal coupling device. The data exchanged with the expansion card comprises the configuration parameters of each neuron circuit, including connection data, and the input and output data to the spiking artificial neural network. The connection data comprises information for each neuron, including but not limited to the neuron type, neurotransmitter type and the neuromodulator to which the synapses and neurons respond. Each synapse contains a register that can be configured to hold the address of a connected neuron, and the synapse responds to spikes that are generated by the neuron of that address. The input data comprises values that are considered relevant to the computation task that is performed by the artificial neuron network. The neural computation is performed rapidly and independent of the central processing unit. The output data comprises values that are the result of the performed neural computation task. The input to the spiking neural network is fed through a data input bus 402, which communicates the input data to a sensory neuron that converts the data into spikes that are in-turn processed by the neural processing units. The temporal and spatial distribution of spikes is representative of the input data. The result of the neural processing unit is converted to digital data by a motor neuron, or alternatively the AER bus, and the resulting data is then communicated to the host computer device through the output data bus 404.

In an embodiment of the present invention, an information processing system intended for use in Artificial Intelligence and having a plurality of digital artificial neuron circuits configurably connected in a network is provided. The system comprising one or more Application Specific Integrated Circuits (ASIC) containing a first plurality of digital dynamic synapse circuits, wherein each digital dynamic synapse contains digital registers that store the address of the connected neuron, the connection efficacy also known as the synapse weight, and certain variable levels, wherein the digital dynamic synapse circuits include a means of learning to respond to input signals; and a second plurality of artificial spiking neuron circuits comprising an integrator circuit that integrates and combines each individually produced synapse value over time to produce an output value that is representative of a biological neuron membrane potential; and a third plurality of spike shaper circuits that each receive input from an integrator circuit and determine the duration and number of output spikes.

Figure 5:
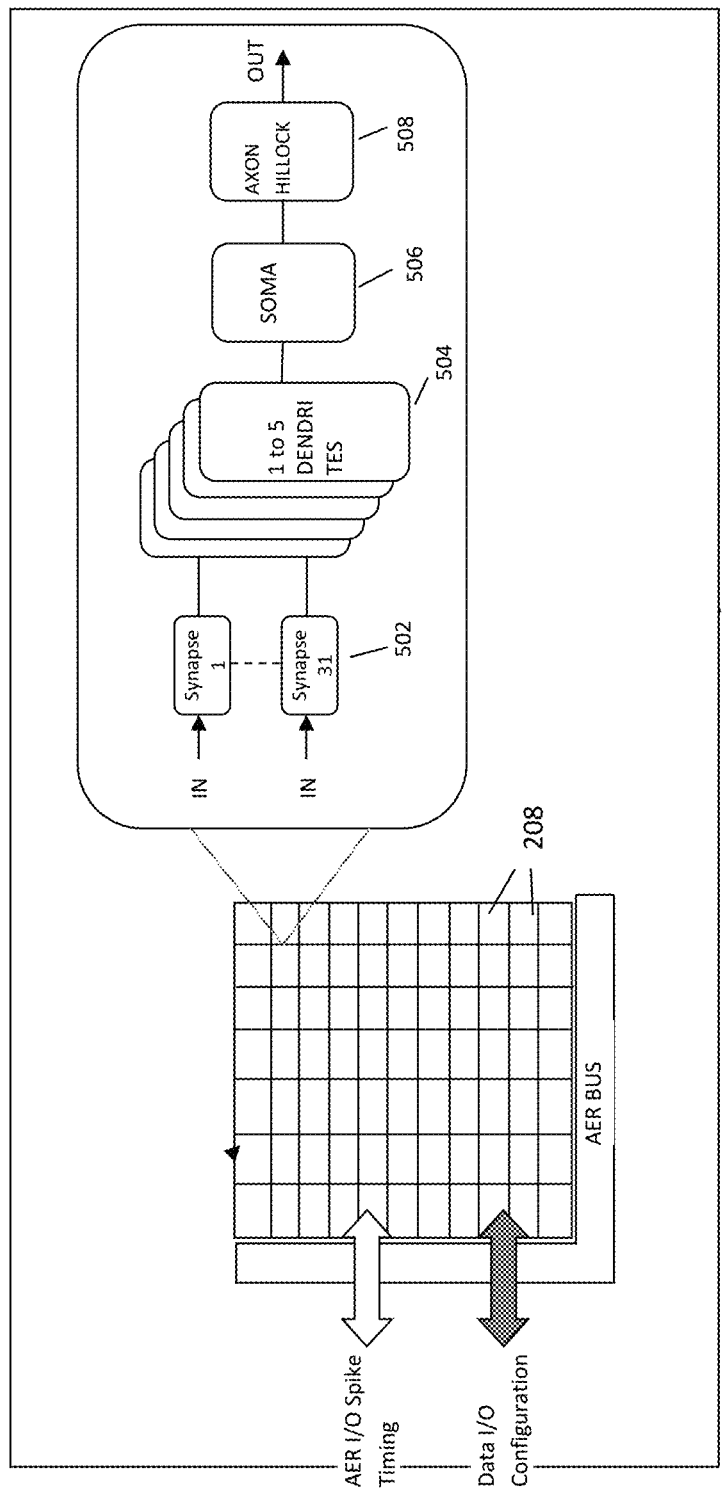
FIG. 5 is a block diagram showing a neural processing unit, in accordance with an embodiment of the present invention.

FIG. 5 is a block diagram showing a neural processing unit in accordance with an embodiment of the present invention. The spiking neural network 206 consists of a plurality of neural processing units 208. Each of the neural processing units is having a plurality of synapses 502, a multiple of dendrites 504, a plurality of soma circuits 506 and axon hillocks 508. Each neural processing unit 208 receives synaptic inputs in the form of spikes, and each synapse performs a temporal integration on the input spikes. The synapses generate a value, generally referred to as the Post Synaptic Potential that is representative of the interval between spikes. The dendrites integrate the Post Synaptic Potentials of all synapses connected to that dendrite, thus performing a spatial integration. Optionally, delays are introduced in the synapses and dendrites. Thereafter, the soma 506 of the neural processing unit performs a spatial integration of the dendrite values. The axon hillock 508 produces an output spike with properties that are directly proportional to the temporal and spatially integrated value produced by the soma.

The expansion card is configured to have a digital hardware logic performing neural network computations and hence, does not require software programming. The expansion card is having a spiking neural network processor which can execute more complex tasks. The spiking neural network processor is intended to model how the human brain works and learns autonomously.

We claim:

1. A spiking neural network accelerator system comprising:
   a spiking neural network comprising digital hardware logic configured to perform functions associated with artificial spiking neurons, dendrites and dynamic synapses, wherein the spiking neural network comprises:
      a plurality of neuron circuits, the plurality of neuron circuits being digital neuron circuits, where each of the plurality of neuron circuits has a unique address; and
      a plurality of synapse circuits, the plurality of synapse circuits being digital synapse circuits, where each of the plurality of synapse circuits has a respective register configured to hold a respective unique address of each of the plurality of neuron circuits connected to the synapse circuit, wherein each synapse circuit generates a value representative of an interval between input spikes,
      wherein each neuron circuit forms a one-to-many connection to at least a portion of the plurality of synapse circuits, wherein neuron circuit-synapse circuit connectivity is configurable by connection data received from a host computing device, and wherein each neuron circuit integrates and combines each individually produced value from each connected synapse circuit to produce an output value that is representative of a biological neuron membrane potential,
      wherein communication of a spike event in the spiking neural network is expressed as an address of an originating neuron circuit that originated the spike event, the spike event being placed on an Address Event Representation (AER) bus, and
      wherein an efficacy of a respective connection between a respective neuron circuit and a synapse circuit is determined by autonomous learning by the digital hardware logic operating without software involvement; and
   an interface to connect the spiking neural network to the host computing device,
   wherein the spiking neural network is initially configured by the host computing device via the interface to make connections between the plurality of neuron circuits and the plurality of synapse circuits of the spiking neural network to perform a specific neural computation task.

2. The spiking neural network accelerator system of claim 1, wherein the digital hardware logic comprises a plurality of digital neural circuits.

3. The spiking neural network accelerator system of claim 2, wherein at least one of the plurality of digital neural circuits simulates a sensory neuron.

4. The spiking neural network accelerator system of claim 2, wherein at least one of the plurality of digital neural circuits simulates a motor neuron.

5. The spiking neural network accelerator system of claim 2, wherein each neuron circuit of the plurality of digital neural circuits transmits its respective unique address.

6. The spiking neural network accelerator system of claim 2, wherein each neural circuit of the plurality of digital neural circuits includes at least one synapse circuit that can be configured to respond to spikes received from a neuron address.

7. The spiking neural network accelerator system of claim 1, wherein the programmable logic circuitry is further configured to provide connection data to the spiking neural network.

8. The spiking neural network accelerator system of claim 7, wherein the connection data includes one or more of a neuron type indicator, an address, a neurotransmitter type value and a neuromodulator value.

9. The spiking neural network accelerator system of claim 1, wherein the digital hardware logic is further configured to increase a synaptic efficacy when a synapse input spike signal precedes a neuron output spike signal, and is further configured to decrease the synaptic efficacy when the synapse input spike signal occurs after the neuron output spike signal, to thereby simulate learning associated with spike time dependent plasticity.

10. The spiking neural network accelerator system of claim 9, whereby the increase or the decrease in the synaptic efficacy is directly proportional to a time that has elapsed between the synapse input spike signal, the neuron output spike signal, and a subsequent synapse input spike signal.

11. The spiking neural network accelerator system of claim 1, wherein the digital hardware logic comprises synchronous or asynchronous combinational digital logic circuits.

12. The spiking neural network accelerator system of claim 1, further comprising:
    an application programming interface adapted to support configuration of the digital hardware logic.

13. A method comprising:
    performing, by a spiking neural network comprising digital hardware logic, functions associated with artificial spiking neurons, dendrites and dynamic synapses, wherein the spiking neural network comprises:
       a plurality of neuron circuits, the plurality of neuron circuits being digital neuron circuits, where each of the plurality of neuron circuits has a unique address; and
       a plurality of synapse circuits, the plurality of synapse circuits being digital synapse circuits, where each of the plurality of synapse circuits has a respective register configured to hold a respective unique address of each of the plurality of neuron circuits connected to the synapse circuit, wherein each synapse circuit generates a value representative of an interval between input spikes,
       wherein each neuron circuit forms a one-to-many connection to at least a portion of the plurality of synapse circuits, wherein neuron circuit-synapse circuit connectivity is configurable by connection data received from a host computing device, and wherein each neuron circuit integrates and combines each individually produced value from each connected synapse circuit to produce an output value that is representative of a biological neuron membrane potential, wherein communication of a spike event in the spiking neural network is expressed as an address of an originating neuron circuit that originated the spike event, the spike event being placed on an Address Event Representation (AER) bus, and wherein an efficacy of a respective connection between a respective neuron circuit and a synapse circuit is determined by autonomous learning by the digital hardware logic operating without software involvement;

connecting, by an interface, the spiking neural network to the host computing device; and initially configuring, by the host computing device via the interface, connections between the plurality of neuron circuits and the plurality of synapse circuits of the spiking neural network to perform a specific neural computation task.

14. The method of claim 13, wherein the digital hardware logic comprises a plurality of digital neural circuits.

15. The method of claim 14, further comprising:
simulating, by at least one of the plurality of digital neural circuits, a sensory neuron.

16. The method of claim 14, further comprising:
simulating, by at least one of the plurality of digital neural circuits, a motor neuron.

17. The method of claim 14, further comprising:
transmitting, by each neuron circuit of the plurality of digital neural circuits, its respective unique address.

18. The method of claim 14, further comprising:
responding, by at least one synapse circuit, to spikes received from a neuron address, the at least one synapse circuit being a part of one of the plurality of digital neural circuits, the at least one synapse circuit configured to respond to the spikes received from the neuron address.

19. The method of claim 13, further comprising:
providing, by the programmable logic circuitry, connection data to the spiking neural network.

20. The method of claim 19, wherein the connection data includes one or more of a neuron type indicator, an address, a neurotransmitter type value and a neuromodulator value.

21. The method of claim 13, further comprising:
increasing, by the digital hardware logic, a synaptic efficacy when a synapse input spike signal precedes a neuron output spike signal; and decreasing the synaptic efficacy when the synapse input spike signal occurs after the neuron output spike signal, to thereby simulate learning associated with spike time dependent plasticity.

22. The method of claim 21, whereby the increasing or the decreasing in the synaptic efficacy is directly proportional to a time that has elapsed between the synapse input spike signal, the neuron output spike signal, and a subsequent synapse input spike signal.

23. The method of claim 13, wherein the digital hardware logic comprises synchronous or asynchronous combinational digital logic circuits.

24. The method of claim 13, further comprising:
supporting configuration, by an application programming interface, of the digital hardware logic.

* * * * *